(12) United States Patent
Haru et al.

(10) Patent No.: US 7,856,257 B2
(45) Date of Patent: Dec. 21, 2010

(54) PORTABLE COMMUNICATIONS TERMINAL

(75) Inventors: Yoshitaka Haru, Kanagawa (JP); Noriyuki Kawahara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 370 days.

(21) Appl. No.: 11/817,163

(22) PCT Filed: Mar. 9, 2006

(86) PCT No.: PCT/JP2006/304633
§ 371 (c)(1),
(2), (4) Date: Aug. 27, 2007

(87) PCT Pub. No.: WO2007/023585
PCT Pub. Date: Mar. 1, 2007

(65) Prior Publication Data
US 2009/0137278 A1    May 28, 2009

(30) Foreign Application Priority Data
Aug. 22, 2005    (JP) .............................. 2005-239927

(51) Int. Cl.
*H04M 1/00* (2006.01)
(52) U.S. Cl. ................. 455/575.3; 455/566; 455/556.1; 379/355.01; 345/156
(58) Field of Classification Search ............. 455/575.3, 455/566, 556.1; 379/355.01; 345/156
See application file for complete search history.

(56) References Cited
U.S. PATENT DOCUMENTS
6,944,481 B2 *   9/2005   Hama et al. ................. 455/566

2002/0037754 A1   3/2002   Hama et al.
2005/0141686 A1   6/2005   Matsunaga et al.
2006/0171524 A1 * 8/2006   Tsuchiya et al. ....... 379/355.01

FOREIGN PATENT DOCUMENTS
| EP | 1 244 275 A1 | 9/2002 |
|---|---|---|
| JP | 3530475 | 5/2004 |
| JP | 2005-191833 | 7/2005 |
| WO | 2004/015967 A1 | 2/2004 |

OTHER PUBLICATIONS
European Search Report.
International Search Report Dated Apr. 4, 2006.

* cited by examiner

*Primary Examiner*—Danh C Le
(74) *Attorney, Agent, or Firm*—Seed IP Law Group PLLC

(57) ABSTRACT

There is provided a portable communications terminal capable of displaying on a main display portion detailed information about a history of incoming calls of a plurality of categories by a single transition from a closed state to an open state.

A user makes a setting, by way of an operation section 17, on histories of incoming calls of categories whose detailed information is desired to be displayed. A newly-arrived information management section 21 generates a data table from the information input by way of the operation section 17, and records the table into newly-arrived information memory 22. Upon acquisition of new history information, the newly-arrived information management section 21 collectively records the history information into the newly-arrived information memory 22 and displays the information on a sub-display portion 18. Subsequently, when two housings are detected to have been opened, the history of incoming calls is updated in accordance with the information recorded in the newly-arrived information memory 22 and displayed on a main display portion 19.

6 Claims, 9 Drawing Sheets

FIG. 2A

| NO. | CATEGORY TYPE | REFERENCE TARGET | TIME |
|---|---|---|---|
| 1 | MAIL | MAIL MEMORY NO.1 | 18:00 |
| 2 | UNATTENDED INCOMING CALL (VOICE CALL) | INCOMING-CALL HISTORY MEMORY NO.1 | 17:50 |
| 3 | UNATTENDED INCOMING CALL (VOICE CALL) | INCOMING-CALL HISTORY MEMORY NO.2 | 17:30 |
| 4 | MEMORANDUM MESSAGE | MEMORANDUM MESSAGE MEMORY NO.1 | 17:00 |

FIG. 2B

| CATEGORY TYPE | THEME | USER SETTING 1 | USER SETTING 2 | COLLECTIVE SETTING |
|---|---|---|---|---|
| UNATTENDED INCOMING CALL (VOICE CALL) | ON | ON | OFF | ON |
| UNATTENDED INCOMING CALL (VIEWPHONE) | ON | ON | OFF | |
| UNATTENDED INCOMING CALL (PUSH-TO-TALK) | ON | ON | OFF | |
| NEWLY-ARRIVED MAIL | OFF | ON | ON | |
| MEMORANDUM MESSAGE | ON | OFF | ON | |
| CALL LEFT IN PHONE-RECORDING TELEPHONE | ON | OFF | ON | |

FIG. 2C

| CATEGORY TYPE | THEME 1 | THEME 2 | USER SETTING 1 | USER SETTING 2 |
|---|---|---|---|---|
| UNATTENDED INCOMING CALL (VOICE CALL) | 1 | 3 | 2 | (OFF) |
| UNATTENDED INCOMING CALL (VIEWPHONE) | 2 | 5 | 4 | (OFF) |
| UNATTENDED INCOMING CALL (PUSH-TO-TALK) | 3 | 4 | 3 | (OFF) |
| NEWLY-ARRIVED MAIL | 4 | (OFF) | 1 | 3 |
| MEMORANDUM MESSAGE | 5 | 1 | (OFF) | 1 |
| CALL LEFT IN PHONE-RECORDING TELEPHONE | 6 | 2 | (OFF) | 2 |

FIG. 5A

| CATEGORY TYPE | USER SETTING 1 |
|---|---|
| UNATTENDED INCOMING CALL (VOICE CALL) | ON |
| UNATTENDED INCOMING CALL (VIEWPHONE) | OFF |
| UNATTENDED INCOMING CALL (PUSH-TO-TALK) | OFF |
| NEWLY-ARRIVED MAIL | ON |
| MEMORANDUM MESSAGE | ON |
| CALL LEFT IN PHONE-RECORDING TELEPHONE | ON |

FIG. 5B

| CATEGORY TYPE | USER SETTING 1 |
|---|---|
| UNATTENDED INCOMING CALL (VOICE CALL) | 2 |
| UNATTENDED INCOMING CALL (VIEWPHONE) | OFF |
| UNATTENDED INCOMING CALL (PUSH-TO-TALK) | OFF |
| NEWLY-ARRIVED MAIL | 1 |
| MEMORANDUM MESSAGE | 3 |
| CALL LEFT IN PHONE-RECORDING TELEPHONE | 4 |

FIG. 5C

| NO. | CATEGORY TYPE | REFERENCE TARGET | TIME |
|---|---|---|---|
| 1 | NEWLY-ARRIVED MAIL | MAIL MEMORY NO.1 | 18:30 |
| 2 | UNATTENDED INCOMING CALL | PHONE MEMORY NO.1 | 18:35 |
| 3 | MEMORANDUM MESSAGE | MEMORANDUM MESSAGE MEMORY NO.2 | 18:00 |
| 4 | CALL LEFT IN PHONE-RECORDING SECTION | CALL LEFT IN PHONE RECORDING SECTION MEMORY NO.1 | 18:20 |

FIG. 8A

| CATEGORY TYPE | USER SETTING 1 |
|---|---|
| UNATTENDED INCOMING CALL (VOICE CALL) | OFF |
| UNATTENDED INCOMING CALL (VIEWPHONE) | OFF |
| UNATTENDED INCOMING CALL (PUSH-TO-TALK) | OFF |
| NEWLY-ARRIVED MAIL | ON |
| MEMORANDUM MESSAGE | OFF |
| CALL LEFT IN PHONE-RECORDING TELEPHONE | OFF |

FIG. 8B

| NO. | CATEGORY TYPE | REFERENCE TARGET | TIME |
|---|---|---|---|
| 1 | NEWLY-ARRIVED MAIL | MAIL MEMORY NO.1 | 18:35 |
| 2 | | MAIL MEMORY NO.2 | 17:00 |
| 3 | | MAIL MEMORY NO.3 | 16:50 |
| 4 | | MAIL MEMORY NO.4 | 16:40 |

PORTABLE COMMUNICATIONS TERMINAL

TECHNICAL FIELD

The present invention relates to a portable communications terminal which shows occurrence of nonresponse to a voice call, information about a newly-arrived mail, the presence or absence of a memorandum message, or the like; and more particularly to a portable communications terminal which shows a history of incoming calls in a display portion when two housings of a two-housing-type portable communications terminal are opened.

BACKGROUND ART

In relation to recent portable cellular phones having phone functions, a two-housing-type portable cellular phone has become predominant. In some of the two-housing-type portable communications terminals, two housings are collapsible (a state where two housings of the portable communications terminal overlap each other is hereinafter called a "closed state," and another state where the two housings do not overlap each other is hereinafter called an "open state.") In the case of the closed state, pieces of various types of information are displayed by a sub-display portion located in an exterior side of the housing. In the case of the open state, pieces of various types of information are displayed in a main display portion located at an area where the two housings overlap each other in the closed state (a display area of the main display portion is usually larger than that of the sub-display portion, and hence, in many cases, simplified information having a small amount of information is displayed in the sub-display portion and detail information—which has a large amount of information and is easy to browse—is displayed in the main display portion).

In Patent Document 1, there is proposed a collapsible communications terminal device which displays occurrence of nonresponse to a voice call, information about a newly-arrived mail, and the presence or absence of a memorandum message, or the like, by utilization of the portable communications terminal. The collapsible communications terminal of Patent Document 1 displays, in a closed state, simplified information about the history of incoming calls (incoming calls, received mails, or the like) in the sub-display portion. Upon detection of the portable communications terminal having been opened by the user who has ascertained simplified information about the history of incoming calls, the portable cellular phone displays in the main display portion detailed information about the history of incoming calls (in the case of incoming calls, a time of receipt of a call, source information, a list of incoming calls; and in the case of an E-mail, a time of receipt of a mail, source information, a title, and the like).

According to the collapsible communications terminal of Patent Document 1, when the user ascertains detail information about the history of incoming calls by opening the terminal, there is no necessity for performing switching operation for displaying an incoming call history screen. Hence, efforts on the part of the terminal user can be lessened.

Patent Document 1: Japanese Patent No. 3530475

DISCLOSURE OF THE INVENTION

Problem that the Invention is to Solve

However, when two or more incoming calls are recorded In the history of incoming calls of categories, such as a category of a nonresponse to a voice call, a category of information about a newly-arrived mail, a category of the presence or absence of a memorandum message (all of communications applications which enable recording of a communications history of some type belong to this category), and the like, a collapsible communications terminal device of Patent Document 1 causes a user to consume efforts to display the history of these incoming calls in the main display portion.

Specifically, the collapsible communications terminal of Patent Document 1 cannot display in the main display portion only detail information about the history of incoming calls of one category. In order to display detailed information about the history of incoming calls of a plurality of categories, it is necessary to display in the main display portion the detailed information about the history of incoming calls of one category not yet having been displayed after detection that the user who has ascertained the detailed information about the history of incoming calls of one category has once closed the terminal and later reopened the terminal. Therefore, when the history of incoming calls of a plurality of categories is recorded, the terminal user must repeat opening and closing of the two housings of the terminal in a number equal to the number of categories.

The present invention has been conceived in view of the circumstance and aims at providing a portable communications terminal which is a two-housing-type portable communications terminal and enables indication, in a main display portion, of detailed information about the history of incoming calls of a plurality of categories by a single transition of the terminal from a closed state to an open state.

Means for Solving the Problem

The present invention provides a portable communications terminal having two openable housings, comprising:

a first display portion for displaying various types of information of when the two housings are closed;

a second display portion for displaying various types of information when the two housings are open;

a storage portion for storing a history of incoming calls received by various communications applications including at least a history of unattended voice calls, a history of receipt of newly-arrived mails, and a history of receipt of memorandum messages; and a display control portion for controlling a display provided by the first display portion or the second display portion, wherein the display control portion displays, when the two housings are closed, incoming calls received by a plurality of communications applications on the first display portion, and, when the two housings are open, shows on the second display portion a single history of incoming calls histories into which incoming calls received by the plurality of respective communications applications are collected.

According to this configuration, detailed information about the history of incoming calls of a plurality of categories is displayed in a main display portion by single transition from a closed state to an open state, whereby operation performed by a terminal user for ascertaining the history of incoming calls can be simplified. Consequently, the ease of use of the terminal by the terminal user can be enhanced.

Moreover, the portable communications terminal of the present invention includes the display control portion that displays, on the second display portion, the single incoming-call history into which the histories of the incoming calls received by the plurality of communications applications are collected by arranging, in sequence of arrival time, pieces of incoming-call information for one call forming the history of incoming calls.

Further, the portable communications terminal of the present invention includes the display control portion that displays, on the second display portion, the single incoming-call history into which the histories of the incoming calls received by the plurality of communications applications are collected in an order of priority previously assigned to the respective communications applications.

Moreover, the portable communications terminal of the present invention includes the display control portion that displays, on the second display portion, the single incoming-call history into which the histories of incoming calls received by pre-selected communications application among the histories of incoming calls received by the plurality of communications applications are collected.

By this configuration, a single history of incoming calls into which incoming-call histories of a plurality of categories are collected according to a specific condition is displayed on the main display portion. Hence, it becomes more easy for the terminal user to ascertain contents of the incoming-mail histories Furthermore, the portable communications terminal of the present invention includes the display control portion that displays, on the second display portion, the history of the incoming calls received by the communications application assigned the highest priority level among histories of incoming calls received by the plurality of communications applications.

According to this configuration, only the information about newly-arrived information about a category most desired to be displayed by the terminal user is displayed, and hence the terminal user can readily ascertain only the newly-arrived information about a desired category.

Advantage of the Invention

According to the portable communications terminal of the present invention, the present invention corresponds to a two-housing-type portable communications terminal capable of displaying on a main display portion detailed information about the history of incoming calls of a plurality of categories by a single transition from a closed state to an open state, thereby enhancing the user operability of the terminal.

BRIEF DESCRIPTION OF THE DRAWINGS

FIG. 2 shows example data tables recorded in newly-arrived information memory of a newly-arrived information management section;

FIG. 5 shows example data tables recorded in the newly-arrived information memory of the newly-arrived information management section according to the first embodiment of the present invention;

FIG. 8 shows example data tables recorded in the newly-arrived information memory of the newly-arrived information management section according to the second embodiment of the present invention.

DESCRIPTIONS OF THE REFERENCE NUMERALS

10 PORTABLE CELLULAR PHONE
11 TRANSCEIVER SECTION
12 DATA CONVERSION SECTION
13 SOUND PROCESSING SECTION
14 MICROPHONE
15 SPEAKER
16 OPEN-AND-CLOSE DETECTION SECTION
17 OPERATION SECTION
18 SUB-DISPLAY PORTION
19 MAIN DISPLAY PORTION
20 CONTROL PORTION
21 NEWLY-ARRIVED INFORMATION MANAGEMENT SECTION
22 NEWLY-ARRIVED INFORMATION MEMORY
23 PHONE-ANSWERING SECTION
24 TELEPHONE SECTION
25 MEMORANDUM MESSAGE SECTION
26 MAIL SECTION
231 PHONE-ANSWERING MEMORY
241 INCOMING CALL HISTORY MEMORY
251 MEMORANDUM MESSAGE MEMORY
261 MAIL MEMORY

BEST MODES FOR IMPLEMENTING THE INVENTION

Portable communications terminals of embodiments of the present invention will be described hereunder by reference to the drawings. A collapsible portable cellular phone is used as an example of the portable communications terminals.

Figure 1:
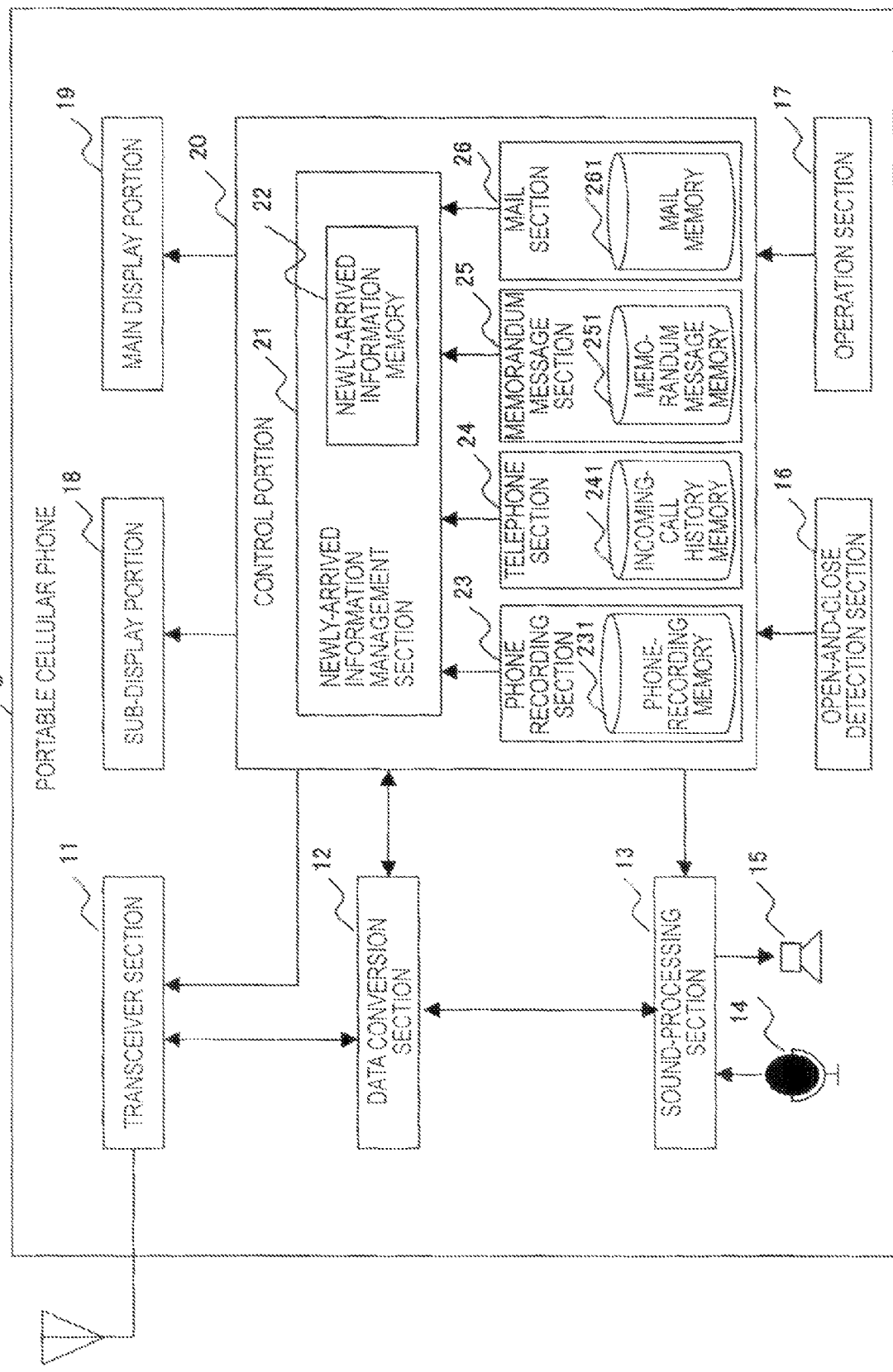
FIG. 1 is a block diagram showing the configuration of a portable cellular phone of the present invention.

FIG. 1 is a block diagram showing the configuration of a portable cellular phone of the present invention.

In FIG. 1, a portable cellular phone 10 comprises a transceiver section 11; a data conversion section 12; a sound-processing section 13; a microphone 14; a speaker 15; an open-and-close detection section 16; an operation section 17; a sub-display portion 18; a main display portion 19; and a control portion 20.

The transceiver section 11 transmits and receives a radio signal of a predetermined frequency band to and from an unillustrated base station by way of an antenna.

The data conversion section 12 performs various types of processing operations such as modulation/demodulation of the radio signal transmitted or received by the transceiver section 11, determination and separation of various sets of data, and like processing.

The sound-processing section 13 performs demodulation of the sound data separated by the data conversion section 12, output of the demodulated sound data to the speaker 15, conversion of the sound data acquired by the microphone 14, and transmission of the thus-converted sound data to the data conversion section 12.

The microphone 14 collects an external sound, converts the thus-collected sound into an electrical signal, and transmits the thus-converted sound signal to the sound-processing section 13.

The speaker 15 plays back the sound signal output from the sound-processing section 13; emits the voice of a party at the other end to the outside; and generates an incoming-call sound.

The open-and-close detection section 16 mechanically detects whether the collapsible portable cellular phone 10 is in an open state or a closed state. When the collapsible portable cellular phone 10 has changed from the open state to the closed state or from the closed state to the open state, the open-and-close detection section 16 detects a change in the closed and open states and outputs a detection signal to the control portion 20.

The operation section 17 comprises numeric keys, character keys, various function keys, and the like. The operation section 17 is used for various operations such as entry of a phone number or characters, setting of categories to be displayed, a selection as to whether the indication sequence of categories to be displayed is a chronological sequence or a sequence synchronous to "prioritization," setting of a top-priority category, and the like.

The sub-display portion 18 is formed from a color or monochrome liquid-crystal display device or an organic EL display device; and indicates pieces of simplified various types of information.

The main display portion 19 is formed from a monochrome liquid-crystal display device, a color liquid-crystal display device, or an organic EL display device; and indicates pieces of detailed various types of information such as information to be reported, character information, current time information, and the like.

The control portion 20 performs various control operations such as processing of the control data separated by the data conversion section 12; entry of various instructions by way of the operation section 17; control of transmission and receiving operations of the transceiver section 11; control of various processing operations performed by the data conversion section 12; control of transmission and receipt of incoming call notification sound data to the sound processing section 13, and the like. Moreover, in accordance with a result of output of the detection signal from the open-and-close detection section 16, the control portion 20 performs control operation as to whether to cause the sub-display portion 18 to show a display, to cause the main display portion 19 to show a display, or to change display contents.

With a view toward controlling alterations in display contents shown on the sub-display portion 18 and alterations in display contents shown on the main display portion 19, the control portion 20 has a newly-arrived information management section 21, newly-arrived information memory 22, and communications applications; e.g., a phone-answering section 23, a telephone section 24, a memorandum message section 25, and a mail section 26.

The newly-arrived information management section 21 manages display information shown on the sub-display portion 18 and display information shown on the main display portion 19. Specifically, the newly-arrived information management section 21 generates a data table from the information input by way of the operation section 17; records the data table into the newly-arrived information memory 22; reads history information recorded in each of memory devices for the communications applications at intervals of predetermined periods of time (or receives the newly-arrived information as history information from the communications applications, each of which transmits the newly-arrived information every time newly-arrived information is detected, in order to update the history information in real time); collectively records the history information into the newly-arrived information memory 22; and displays newly-recorded history information on the sub-display portion 18 upon detection of new history information having been recorded in the newly-arrived information memory 22. Subsequently, when the open-and-close detection section 16 has detected opening of the two housings of the portable telephone 10, the history of incoming calls is updated in accordance with the information recorded in the newly-arrived information memory 22.

FIG. 2 shows example data tables recorded in the newly-arrived information memory 22 of the newly-arrived information management section 21.

FIG. 2A shows an example table of the newly-arrived information memory 22. In this example, the table includes items such as a category type 201, an object 202 to which a reference is to be made (hereinafter simply called a "reference target"), a time-of-recording 203, and the like. The category type 201 shows the types of categories recorded in the newly-arrived information memory 22; for example, arrival of a mail, arrival of an unattended voice call, receipt of a memorandum message, and the like. The reference target 202 shows a designation where each of newly-arrived pieces of information is stored. A newly-arrived mail is stored in mail memory, for example, as No. 1. The time shows a time when the newly-arrived information was recorded. For instance, the time when the mail newly arrived is 18:00.

FIG. 2B is an example of an ON/Off setting table of a newly-arrived information display. This example includes items, such as a category type 204, a theme 205, user settings 206 and 207, a global setting 208, and the like. The category type 204 relates to a category which is an object of a setting as to whether or not newly-arrived information is displayed. The theme 205 shows the state of settings made at the time of shipment of the portable cellular phone 10 from a manufacturer. When the user does not make any settings, the portable cellular phone 10 operates in the state of settings shown by this theme 205. Here, the category set to "ON" becomes an object to which newly-arrived information is displayed, and the category set to "OFF" does not become an object to which newly-arrived information is displayed. For instance, the newly-arrived mail is set to "OFF" in this example, and hence a newly-arrived mail is not displayed as newly-arrived information even when a mail has newly arrived. Although the theme 205 serves as a setting for activation/deactivation of a display of newly-arrived information determined by the manufacturer, the number of items is not limited to one, as in the case of a table of FIG. 2C. A plurality of themes (themes which differ from each other in terms of setting of ON/OFF) may be present, and the user may select any preferable theme. When the user desires to select a theme, one of the plurality of themes is preferably set as an initial value.

The user settings 206 and 207 show a state set by the user. The user settings 206 and 207 show different states, respectively. The global setting 208 shows a state where all of the categories are set to ON (or OFF) globally.

FIG. 2C is an example priority table for a newly-arrived information display. Here, categories set to OFF by the ON/OFF setting of Newly-Arrived Information Display become ineligible for priority setting.

The phone-answering section 23 is a phone-answering application. When an automatic answering message is stored in a phone-answering center, a notification that there is an automatic answering message reported by a phone-answering center is recorded in a phone-answering memory 231.

The telephone section 24 is a telephone application, and processes phone data of the sets of data output by the data conversion section 12 and records the history of incoming phone calls by use of incoming call history memory 241.

The memorandum message section 25 is a memorandum message application, and processes memorandum message data of the sets of data output by the data conversion section 12 and records the history of memorandum messages and details thereof by use of memorandum message memory 251.

The mail section 26 is a mail application, and processes mail data of the sets of data output by the data conversion section 12 and records the history of incoming mails and mails by use of mail memory 261.

Transition of a screen display of the portable cellular phone 10 of the present invention configured as mentioned above will now be described.

First, under control of the control portion 20, the collapsible portable cellular phone 10 transmits and receives a signal to and from a base station (not shown) according to a predetermined protocol, to thus register its position, and enters a standby condition. This case stands on the assumption that the collapsible portable cellular phone 10 remains closed.

FIG. 3 shows transition of a screen display of the sub-display portion 18 and transition of a screen display of the main display portion 19.

Figure 3A:
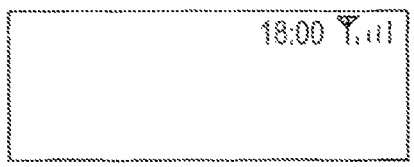
FIG. 3 is a view showing transition of a screen indication from a sub-display portion to a main display portion.

FIG. 3A shows a display screen of the sub-display portion 18 in a standby state. The control portion 20 acquires a current time from a clock circuit (not shown) and the intensity of an electric field from an RSSI detection section (not shown), and displays pictograms corresponding to the time (18:00) and the intensity of an electric field.

Figure 3B:
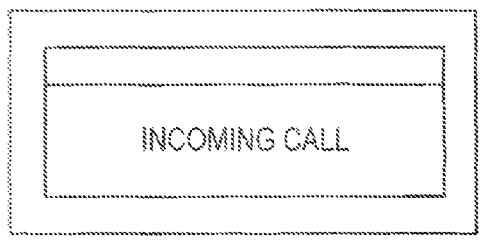

FIG. 3B shows a state subsequent to the display screen of FIG. 3A where, in spite of a voice call having arrived, the call is left unattended. As shown in FIG. 3B, "Incoming Call" appears on the sub-display portion 18.

Figure 3C:
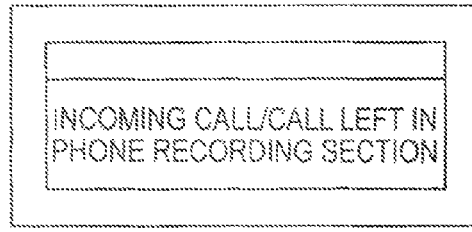

FIG. 3C shows a state where a message is left in the phone-answering section after arrival of an incoming voice call; namely, a display status subsequent to the display screen of FIG. 3B where a message is left in the phone-answering section. As shown in FIG. 3C, "Incoming Call/Message in Phone-Answering Section" appears on the sub-display portion 18.

Figure 3D:
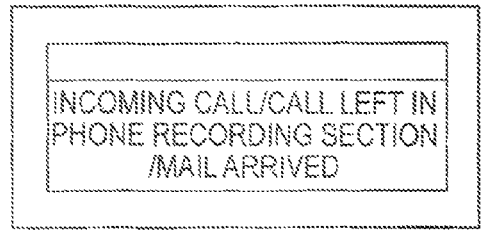

FIG. 3D shows a display status achieved when a mail has arrived in the state shown in FIG. 3C; namely, a display status achieved when a mail has additionally arrived in the display screen shown in FIG. 3B. As shown in FIG. 3D, "Incoming Call/Message in Phone-Answering Section/Mail Arrived" appears on the sub-display portion 18.

Figure 3E:

As mentioned above, the sub-display portion 18 shows incoming calls of a plurality of categories. When the portable cellular phone 10 is opened in this state, the display of the sub-display portion 18 is halted, and "Newly-Arrived Information List" as shown in FIG. 3E appears in the main display portion 19. This main display portion 19 shows detailed information about an incoming call/a message in the phone-answering section/a mail; namely, detailed information such as the time of arrival of a call, the name of a call originator, the history of messages in the phone-answering section, the time of receipt of a mail, the name of a source, the title of a mail, and the like.

Thus, when the portable cellular phone 10 is closed, the sub-display portion 18 can display information about incoming calls of a plurality of categories. When the portable cellular phone 10 is opened, information about the detailed history of incoming calls of a plurality of categories can be displayed on the main display portion 19 without involvement of operation, and user operability of the portable cellular phone 10 is enhanced.

A first embodiment where the history of incoming calls of a plurality of categories is displayed collectively and a second embodiment for displaying only the history of incoming calls belonging to the categories of the highest priority will be described in detail hereunder.

FIRST EMBODIMENT

The present embodiment is an example where the user has set a plurality of categories to "Newly-Arrived Message Display ON" and where the main display portion 19 provides a display according to the setting.

Figure 4:
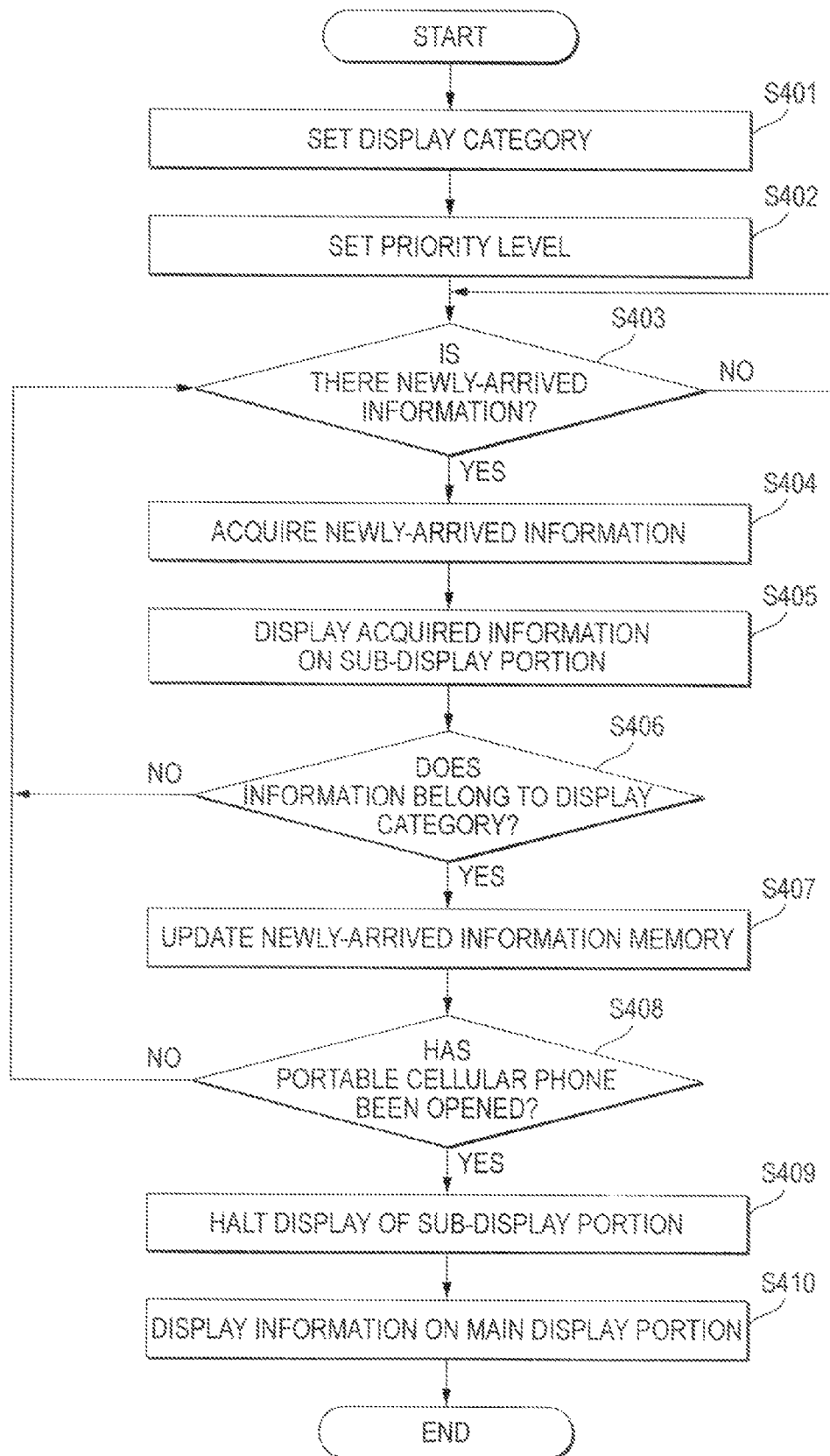
FIG. 4 is a flowchart for describing display operation of a first embodiment of the present invention.

FIG. 4 is a flowchart showing displaying operation of the present embodiment.

First, the user makes display settings by use of the operation section 17 (step S401). The user selects from setting items shown in FIG. 2B a category whose newly-arrived information is desired to be displayed, and a result of selection is input by way of the operation section 17. The newly-arrived information management section 21 generates a data table from the information input by way of the operation section 17, and records the thus-generated data table into the newly-arrived information memory 22. FIG. 5A shows a data table generated when automatic receipt of a voice call, a newly-arrived mail, a memorandum message, and a phone-receiving telephone set have been selected. In the data table shown in FIG. 5A, the selected categories are set to Newly-Arrived Information Display ON, and the other categories are set to OFF. Moreover, when the user does not select any categories whose newly-arrived information is desired to be displayed and when the setting (theme) made at the time of shipment of the portable cellular phone 10 is input as the result of selection, a data table is generated from information about the theme, and the thus-generated data table is recorded in the newly-arrived information memory 22.

When there is newly-arrived information belonging to any of the thus-set categories, the user sets by use of the operation section 17 an order of priority of screens displayed in the main display portion 19 at the time of opening of the portable cellular phone 10 (step S402). In relation to the categories set to the Newly-Arrived Information Display ON, the user sets an order of priority for display by use of the operation section 17. FIG. 5B shows an example setting of the order of priority. In FIG. 5B, the order of priority for display are as follows: namely, the first priority level is placed on a newly-arrived mail; the second priority level is placed on automatic receipt of a voice call; the third priority level is placed on the memorandum message; and the final priority level is placed on the phone-receiving telephone set. Alternatively, the order of priority may also be set in chronological sequence.

The newly-arrived information management section 21 determines whether or not there is newly-arrived information (step S403). When there is no newly-arrived information, processing pertaining to step S403 is performed repeatedly, and arrival of new information is awaited. Now, the newly-arrived information management section 21 reads, at intervals of predetermined periods of time, the pieces of history information recorded in the respective memory devices for a communications application; i.e., the phone-answering memory 231, the incoming call history memory 241, the memorandum message memory 251, and the mail memory 261, thereby determining whether or not there is newly-arrived information. Alternatively, when any of the phone-answering section 23, the telephone section 24, the memorandum message section 25, and the mail section 26 is determined to have newly recorded history, information about the history is sent to the newly-arrived information management section 21. The newly-arrived information management section 21 determines, from the presence/absence of information about new history from each of the sections for communications application, whether or not there is newly-arrived information.

Figure 6A:
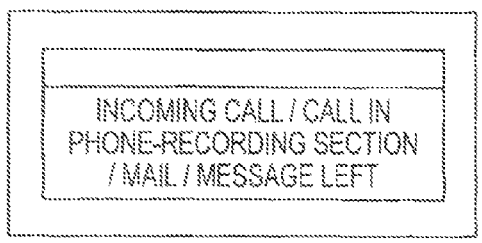
FIG. 6 shows display examples of the sub-display portion and those of the main display portion according to the first embodiment of the present invention.
Figure 6B:
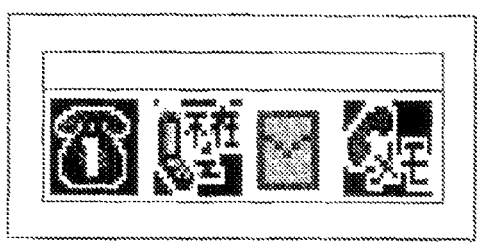

When having determined that there is newly-arrived information, the newly-arrived information management section 21 acquires the newly-arrived information (step S404). When recording of new history information into the newly-arrived information memory 22 is detected in step S404, the presence of newly-recorded, newly-arrived information is displayed on the sub-display portion 18 (step S405). FIG. 6A shows an example display of the sub-display portion 18 appearing in the form of character information. FIG. 6B shows an example display of the sub-display portion 18 appearing in the form of a mark (marks indicating, from the left in the drawing, Incoming Call/Call in Phone-Receiving Section/Mail/Message Being Left).

The newly-arrived information management section 21 determines whether or not the acquired newly-arrived information is newly-arrived information belonging to the category set in step S401 whose newly-arrived information is desired to be displayed (step S406). This determination is made as to whether or not the acquired newly-arrived information corresponds to newly-arrived information belonging to the category set to Newly-Arrived Information Display ON in the data table shown in FIG. 5A.

When in step S406 the acquired newly-arrived information is determined not to correspond to the newly-arrived information belonging to the category whose newly-desired information is desired to be displayed, processing returns to step S403, where a determination is again rendered as to whether or not there is newly-arrived information.

Meanwhile, when in step S406 the acquired newly-arrived information is determined to correspond to the newly-arrived information belonging to the category whose newly-arrived information is desired to be displayed, information in the newly-arrived information memory 22 is updated (step S407) When the newly-arrived information belonging to the category set to Newly-Arrived Information Display ON is a plurality of pieces, incoming-call histories are grouped into a single history according to the acquired pieces of newly-arrived information. At this time, when the incoming call histories are re-arranged according to the order of priority set in step S402 or order of priority for display are set in chronological sequence, pieces of information which are equivalent to one incoming call and constitute the history of incoming calls are re-arranged in chronological sequence. FIG. 5C shows an example re-arrangement of incoming-call histories according to the order of priority. This example of re-arrangement corresponds to re-arrangement of incoming-call histories according to the order of priority set in FIG. 5B.

The control portion 20 determines whether or not the portable cellular phone 10 is opened (step S408). When the portable cellular phone 10 has changed from the closed state to the open state, the open-and-close detection section 16 detects a change in the open-and-close state and outputs a detection signal to the control portion 20. The control portion 20 determines, from the presence or absence of the detection signal from the open-and-close detection section 16, whether or not the portable cellular phone 10 is opened.

When in step S408 the detection signal from the open-and-close detection section 16 is determined not to be present; namely, when the portable cellular phone 10 is determined not to be opened, processing returns to step S403, and a determination is again made as to whether or not there is newly-arrived information.

Figure 6C:
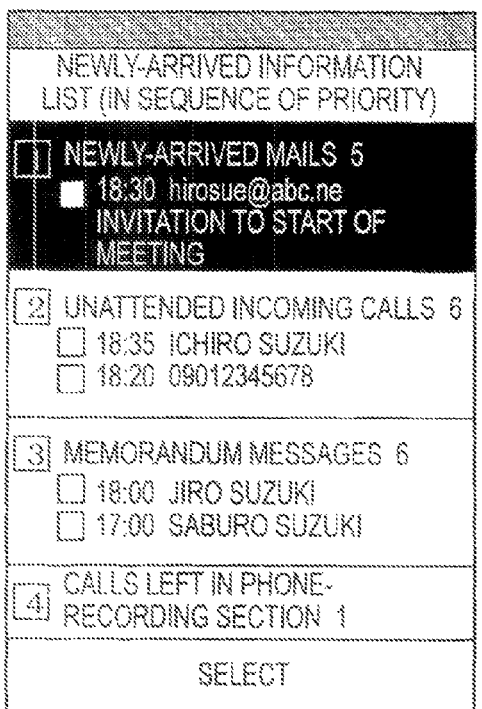
Figure 6D:
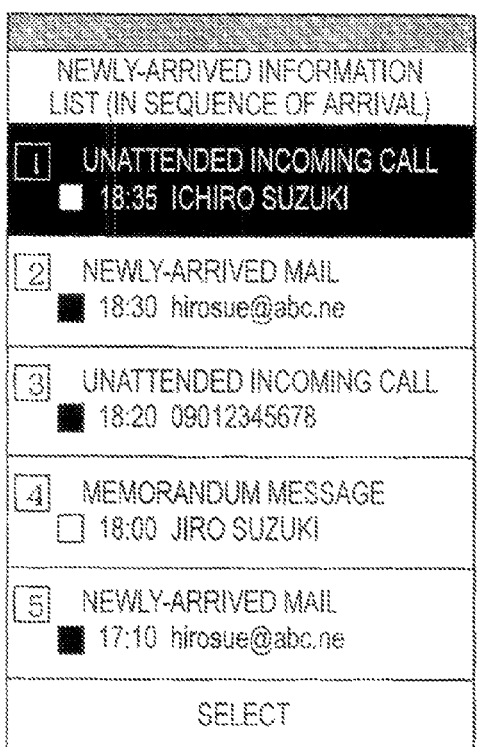

When in step S408 the detection signal from the open-and-close detection section 16 is determined to be present; namely, when the portable cellular phone 10 is determined to be opened, the display of the sub-display portion 18 is halted (step S409). The history of incoming calls is updated in accordance with the information recorded in the newly-arrived information memory 22 and displayed in the main display portion 19 (step S410). FIG. 6C shows an example displaying a list of a plurality of pieces of newly-arrived information in sequence by category. FIG. 6D shows an example displaying a list of a plurality of pieces of newly-arrived information in chronological sequence (in newly-arrival sequence). The list of pieces of newly-arrived information shown in FIG. 6C is displayed by reference to the newly-arrived information shown in FIG. 5C in accordance with the displayed order of priority set in step S402. Since the newly-arrived mails are set to the highest priority level in step S402, the newly-arrived mail shown in FIG. 6C is displayed at the position of "one" in the display screen. Displayed details are displayed by reference to the information stored in the mail memory 261 as shown in FIG. 5C. An unattended incoming call, a memorandum message, and a message in the phone-receiving section are also displayed in the order of priority by reference to the respective pieces of information. When the user depresses a key having a selective function with "Newly-Arrived Mail" being reversely displayed, further-detailed information; e.g., the body of a mail, is displayed on the main display portion 19.

A list of pieces of newly-arrived information shown in FIG. 6D is arranged in chronological sequence without regard to the types of categories. In this case, a new history is displayed at the highest priority level.

As mentioned above, in the first embodiment, when there are pieces of newly-arrived information belonging to a plurality of categories, the plurality of pieces of newly-arrived information are collectively displayed as a single piece of information in the main display portion. Thereby, even when there are a plurality of categories, pieces of newly-arrived information belonging to a plurality of categories can be displayed concurrently in the main display portion, and the user operability of the portable cellular phone is enhanced.

SECOND EMBODIMENT

The present embodiment is an example where the user sets, to Newly-Arrived Display "ON," only the category whose newly-arrived information is most desired to be displayed, and where the main display portion 19 shows a display according to the setting.

Figure 7:
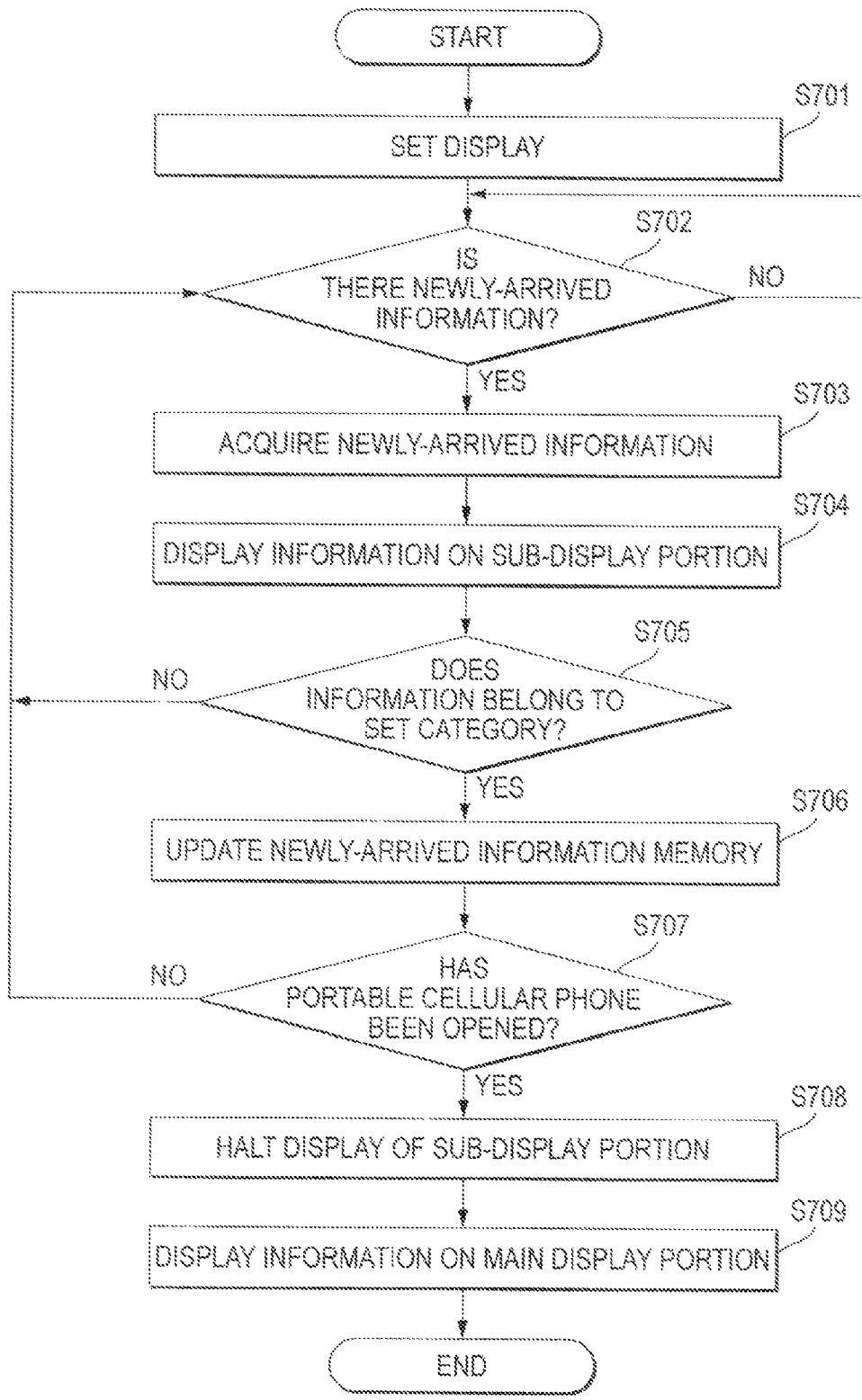
FIG. 7 is a flowchart for describing display operation of a second embodiment of the present invention.

FIG. 7 is a flowchart showing operation of the present embodiment.

First, the user makes display setting by use of the operation section 17 (step S701). The user selects one category whose newly-arrived information is most desired to be displayed from among the setting items shown in FIG. 2B, and inputs a result of selection by way of the operation section 17. The newly-arrived information management section 21 generates a data table from the information input by way of the operation section 17, and records the thus-generated data table into the newly-arrived information memory 22. FIG. 8A shows a data table generated when the newly-arrived mail is selected. Only the selected newly-arrived mail is set to Newly-Arrived Information Display ON in the data table shown in FIG. 8A, and the other categories are set to OFF.

The newly-arrived information management section 21 determines whether or not there is newly-arrived information (step S702). When no newly-arrived information is determined to be present, processing pertaining to step S702 is performed repeatedly, and arrival of new information is awaited. Now, the newly-arrived information management section 21 reads, at intervals of predetermined periods of time, the history information recorded in the mail memory 261, thereby determining whether or not there is newly-arrived information. Alternatively, with a view toward updating history information about newly-arrived mails in real time, when the mail section 26 is determined to have detected a newly-arrived mail and recorded a new history, history information about that newly-arrived mail is delivered to the newly-arrived information management section 21. The newly-arrived information management section 21 determines, from the presence or absence of new history information from the mail section 26, whether or not there is newly-arrived information.

Figure 9A:
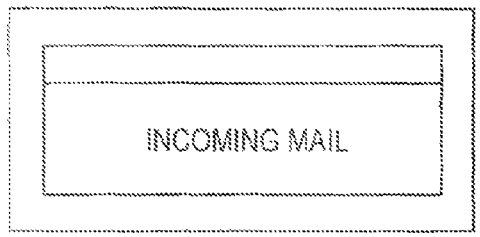
FIG. 9 shows display examples of the sub-display portion and those of the main display portion according to the second embodiment of the present invention.
Figure 9B:
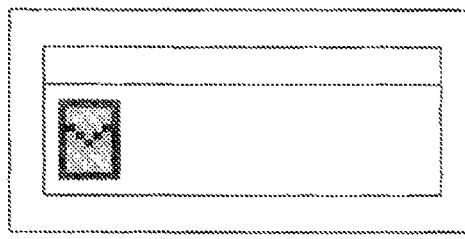

When having determined that there is newly-arrived information, the newly-arrived information management section 21 acquires the newly-arrived information (step S703). When recording of new history information into the newly-arrived information memory 22 is detected, the presence of newly-recorded, newly-arrived information is displayed on the sub-display portion 18 (step S704). FIG. 9A shows an example display of the sub-display portion 18 appearing in the form of character information. FIG. 9B shows an example display of the sub-display portion 18 appearing in the form of a mark.

The newly-arrived information management section 21 determines whether or not the acquired newly-arrived information is newly-arrived information belonging to the category set in step S701 whose newly-arrived information is most desired to be displayed (step S705). This determination is made as to whether or not the acquired newly-arrived information corresponds to newly-arrived information belonging to the category set to Newly-Arrived Information Display ON in the data table shown in FIG. 8A; namely, a newly-arrived mail.

When in step S705 the acquired newly-arrived information is determined not to correspond to the newly-arrived information belonging to the category whose newly-arrived information is desired to be displayed, processing returns to step S702, where a determination is again rendered as to whether or not there is newly-arrived information.

Meanwhile, when in step S705 the acquired newly-arrived information is determined to correspond to the newly-arrived information belonging to the category whose newly-arrived information is desired to be displayed, information in the newly-arrived information memory 22 is updated (step S706) FIG. 8B shows an example of data in the newly-arrived information memory 22.

The control portion 20 determines whether or not the portable cellular phone 10 is opened (step S707). When the portable cellular phone 10 has changed from the closed state to the open state, the open-and-close detection section 16 detects a change in the open-and-close state and outputs a detection signal to the control portion 20. The control portion 20 determines, from the presence or absence of the detection signal from the open-and-close detection section 16, whether or not the portable cellular phone 10 is opened.

When in step S707 the detection signal from the open-and-close detection section 16 is determined not to be present; namely, when the portable cellular phone 10 is determined not to be opened, processing returns to step S702, and a determination is again made as to whether or not there is newly-arrived information.

Figure 9C:

When in step S707 the detection signal from the open-and-close detection section 16 is determined to be present; namely, when the portable cellular phone 10 is determined to be opened, the display of the sub-display portion 18 is halted (step S708). The history of incoming calls is updated in accordance with the information recorded in the newly-arrived information memory 22 and displayed on the main display portion 19 (step S709). FIG. 9C shows an example displaying only newly-arrived information of only one category. The list of pieces of newly-arrived information shown in FIG. 9C shows in chronological sequence only the newly-arrived information about the newly-arrived mails set in step S701. When the user depresses a key having a selective function with one of "Newly-Arrived Mails" being reversely displayed, further-detailed information; e.g., the body of a mail, is displayed on the main display portion 19.

Figure 9D:

In the above, descriptions have been provided for the case where settings are made so as to display only the history of incoming calls of one specific category. However, when the history of incoming calls is recorded in the memory of only one section among the phone-recording section, the telephone section, the memorandum message section, and the mail section, the user may choose to display only newly-arrived information in the category for which the history of incoming calls is recorded. For instance, when the history of incoming calls is recorded in only the incoming call history memory 241 of the telephone section 24, only the history of unattended incoming calls may also be displayed. FIG. 9D shows an example display of the history of unattended incoming calls.

As mentioned above, in the second embodiment, when the portable cellular phone 10 is opened, the main display portion 19 displays only details of the newly-arrived information in the category of the highest priority level. As a result, the newly-arrived information of the category that the user most desires to display can be automatically displayed.

The present invention is not at all limited to the above-described embodiments and can be implemented in various forms within the scope of the gist of the invention. For example, the following are conceivable.

(1) When "Memorandum Message Left" appears on the sub-display portion, a memorandum message list screen appears or the message is played back as a result of opening of the two housings.

(2) When "Incoming Call" appears on the sub-display portion, a call is automatically originated by dialing a phone number of the unattended call as a result of opening of the two housings or the user is caused to ascertain call origination. However, unsolicited, automated single-ring-and-hang-up solicitation calls (incoming calls of given number of seconds or less), phone numbers unregistered in a telephone directory, and phone numbers whose dialing is limited by the user are not taken as objectives of operation, thereby preventing the user from originating an unwanted call.

(3) In relation to the function of playing back a memorandum message or origination of a call at the time of opening of the two housings, automatic playback and automatic call origination are not performed during playback of the music, in order to prevent unintended stoppage of playback of the music.

(4) When the two housings are opened, information such as a schedule, a ToDo schedule, and the like (a schedule list screen, a detailed schedule screen), as well as newly-arrived information can be added as an object of display. For instance, a schedule of that day, an expired ToDo list, and the like, are displayed.

As mentioned above, as a result of once transition from the closed state to the open state, the portable communications terminal of the present invention enables display, on the main display portion, of detailed information about the history of incoming calls of a plurality of categories, and the user operability of the terminal is enhanced.

Although the present invention has been described in detail or by reference to a specific embodiment, it is manifest to persons skilled in the art to be able to add various alterations or modifications without departing from the spirit and scope of the present invention.

The present patent application is based on Japanese Patent Application (JP-A-2005-239927) filed on Aug. 22, 2005, and contents of the application are incorporated herein by reference.

INDUSTRIAL APPLICABILITY

As mentioned above, the portable communications terminal of the present invention enables display, on the main display portion, of detailed information about the history of incoming calls of a plurality of categories by a single transition from the closed state to the open state; and yields an advantage of enhancement of user operability of the terminal. The portable communications terminal corresponds to a two-housinq-type portable communications terminal and is useful as a portable communications terminal or the like for displaying the history of a plurality of incoming calls on the display portion when the two housings are opened.

The invention claimed is:

1. A portable communications terminal having two openable housings, comprising:
    a first display portion for displaying various types of information when the two housings are closed;
    a second display portion for displaying various types of information when the two housings are open;
    a storage portion for storing a history of incoming calls received by various communications applications including at least a history of unattended voice calls, a history of receipt of newly-arrived mails, and a history of receipt of memorandum messages; and
    a display control portion for controlling a display provided by the first display portion and the second display portion,
    wherein the display control portion displays incoming calls received by a plurality of communications applications on the first display portion when the two housings are closed, and displays, on the second display portion, a single incoming-call history into which histories of incoming calls received by the plurality of respective communications applications are collected at the same time when the two housings are open.

2. The portable communications terminal according to claim 1,
    wherein the display control portion displays, on the second display portion, the single incoming-call history into which the histories of the incoming calls received by the plurality of communications applications are collected in an order of arrival time of each incoming call forming the history of incoming calls.

3. The portable communications terminal according to claim 1,
    wherein the display control portion displays, on the second display portion, the single incoming-call history into which the histories of the incoming calls received by the plurality of communications applications are collected in an order of priority previously assigned to the respective communications applications.

4. The portable communications terminal according claim 1,
    wherein the display control portion displays, on the second display portion, the single incoming-call history into which the histories of incoming calls received by pre-selected communications application among the histories of incoming calls received by the plurality of communications applications are collected.

5. The portable communications terminal according to claim 1,
    wherein the display control portion displays, on the first display portion, a single notice of the incoming calls into which notices of the incoming calls received by the plurality of respective communications applications are collected, when the two housings are closed.

6. A portable communications terminal having two openable housings, comprising:
    a first display portion for displaying various types of information when the two housings are closed;
    a second display portion for displaying various types of information when the two housings are open;
    a storage portion for storing a history of incoming calls received by various communications applications including at least a history of unattended voice calls, a history of receipt of newly-arrived mails, and a history of receipt of memorandum messages; and
    a display control portion for controlling a display provided by the first display portion and the second display portion,
    wherein the display control portion displays incoming calls received by a plurality of communications applications on the first display portion when the two housings are closed, and displays, on the second display portion, a history of the incoming calls received by the communications application that is assigned the highest priority level among histories of incoming calls received by the plurality of communications applications.

* * * * *